US008200594B1

(12) United States Patent
Bleiweiss (10) Patent No.: US 8,200,594 B1
(45) Date of Patent: Jun. 12, 2012

(54) SYSTEM, METHOD, AND COMPUTER PROGRAM PRODUCT FOR ACCELERATING A GAME ARTIFICIAL INTELLIGENCE PROCESS

(75) Inventor: Avi I. Bleiweiss, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 937 days.

(21) Appl. No.: 12/207,916

(22) Filed: Sep. 10, 2008

(51) Int. Cl.
*G06F 17/00* (2006.01)

(52) U.S. Cl. .......................................... 706/45; 345/474

(58) Field of Classification Search ...................... 706/45
See application file for complete search history.

(56) References Cited

U.S. PATENT DOCUMENTS

| | | | | |
|---|---|---|---|---|
| 5,808,887 | A * | 9/1998 | Dorst et al. | 345/474 |
| 7,219,085 | B2 * | 5/2007 | Buck et al. | 706/12 |
| 7,548,892 | B2 * | 6/2009 | Buck et al. | 706/12 |
| 7,620,530 | B2 * | 11/2009 | Bordes et al. | 703/2 |
| 7,697,004 | B2 * | 4/2010 | Regelous | 345/474 |
| 2008/0030503 | A1 * | 2/2008 | Yeh | 345/473 |
| 2009/0262119 | A1 * | 10/2009 | Yeh | 345/473 |
| 2010/0045682 | A1 * | 2/2010 | Ford et al. | 345/502 |
| 2010/0091018 | A1 * | 4/2010 | Tatarchuk et al. | 345/423 |
| 2010/0141666 | A1 * | 6/2010 | Christopher et al. | 345/520 |

OTHER PUBLICATIONS

Steinkraus, D.; Buck, I.; Simard, P.Y.; , "Using GPUs for machine learning algorithms," Document Analysis and Recognition, 2005. Proceedings. Eighth International Conference on , vol., no., pp. 1115-1120 vol. 2, Aug. 29-Sep. 1, 2005.*
Bleiweiss, "GPU Accelerated Pathfinding," Graphics Hardware 2008.
Bleiweiss, "GPU Accelerated Pathfinding," Graphics Hardware 2008, copyright The Eurographics Association 2008.
Shopf, "Crowd Simulation in Froblins," SIGGRAPH2008, copyright Advanced Micro Devices, Inc., 2008.

* cited by examiner

*Primary Examiner* — Jeffrey A Gaffin
*Assistant Examiner* — David H Kim
(74) *Attorney, Agent, or Firm* — Zilka-Kotab, PC (57) ABSTRACT

A system, method, and computer program product are provided for accelerating a game artificial intelligence process. In one embodiment, a graphics processor is provided, the graphics processor being capable of accelerating a game artificial intelligence process. In another embodiment, a graphics processor is provided, the graphics processor being capable of accelerating a navigational planning artificial intelligence process.

21 Claims, 7 Drawing Sheets

FIGURE 6

SYSTEM, METHOD, AND COMPUTER PROGRAM PRODUCT FOR ACCELERATING A GAME ARTIFICIAL INTELLIGENCE PROCESS

FIELD OF THE INVENTION

The present invention relates to gaming, and more particularly to accelerating an artificial intelligence process in the context of gaming.

BACKGROUND

One challenge in games is determining how to handle autonomous navigation and planning of many agents (i.e. non-player characters) in a scene with both static and dynamic moving obstacles. In a real-time game, agents must find their route to a particular goal position avoiding collisions with obstacles or other agents in the environment. The computational complexity of simulating multiple agents in a crowded scene becomes intractable and arises from the fact that each moving agent is a dynamic obstacle to other agents.

Ideally, each agent would navigate independently without implying any global coordination or synchronization of all or a subset of the agents involved. This is analogous to the way individual humans navigate in a shared environment, where each person makes independent observations and decisions without explicit communication with others.

Navigational planning techniques for multi-agent environments have been traditionally studied in the domain of robotics and in recent years have been increasingly applied to games. Centralized techniques consider the sum of all agents to be a single agent and a solution is searched in a composite space. However, as the number of agents increases, problem complexity becomes prohibitively high. Decoupled planners, on the contrary, are more distributed but require coordination space that may not always guarantee completeness.

A real-time motion planning technique using per-particle energy minimization and adopting a continuum perspective of the environment is one technique that has been implemented. This formulation yields a set of dynamic potential and velocity fields over a domain that guide all individual motion simultaneously. This approach unifies global path planning and local collision avoidance into a single optimization framework.

Using this technique, the global planning assumption produces significantly smoother and more realistic crowd motion. Nonetheless, in avoiding agent based dynamics altogether the ability to succinctly express the computation in parallel becomes fairly constraint. There is thus a need for addressing these and/or other issues associated with the prior art.

SUMMARY

A system, method, and computer program product are provided for accelerating a game artificial intelligence process. In one embodiment, a graphics processor is provided, the graphics processor being capable of accelerating a game artificial intelligence process. In another embodiment, a graphics processor is provided, the graphics processor being capable of accelerating a navigational planning artificial intelligence process.

DETAILED DESCRIPTION

Figure 1:
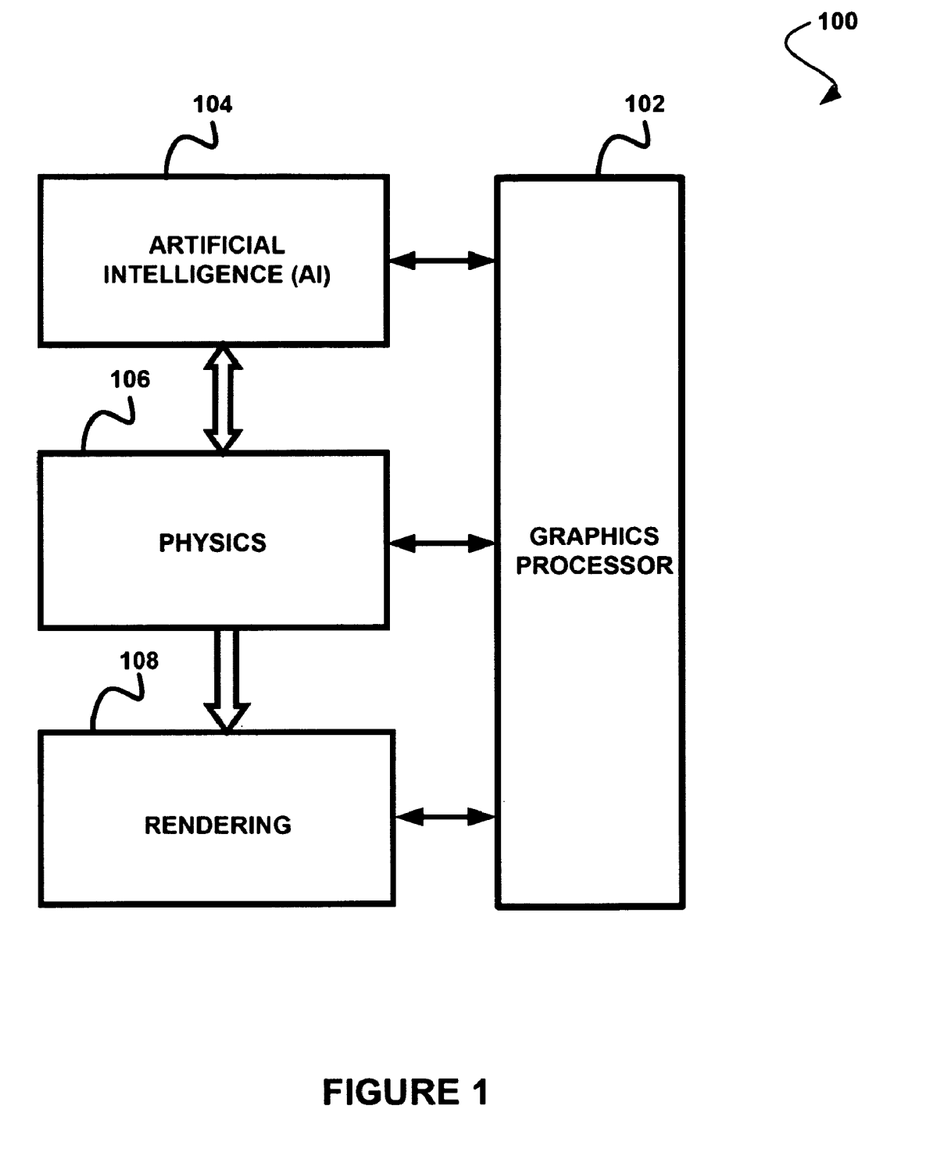
FIG. 1 shows a system for accelerating a game artificial intelligence process, in accordance with one embodiment.

FIG. 1 shows a system 100 for accelerating a game artificial intelligence process, in accordance with one embodiment. As shown, a graphics processor 102 is provided. As an option, the graphics processor 102 may include a graphics processing unit (GPU).

Additionally, in one embodiment, the graphics processor 102 may include a parallel processor architecture. For example, the parallel processing architecture may include a single instruction multiple data (SIMD) architecture. In another embodiment, the graphics processor 102 may include a multi-core processor architecture.

In operation, the graphics processor 102 is capable of accelerating a game artificial intelligence process. In the context of the present description, a game artificial intelligence process refers to any process used in computer games and/or video games to produce an illusion of intelligence in the behavior of non-player characters (i.e. NPCs or agents, etc.). For example, in one embodiment, the game artificial intelligence process may include a navigational planning artificial intelligence process.

In this case, the graphics processor 102 may be capable of accelerating a navigational planning artificial intelligence process. In the context of the present description, a navigational planning artificial intelligence process refers to any process used in computer games and/or video games to plan and/or implement a navigational strategy for non-player characters (i.e. NPCs or agents, etc.). For example, in various embodiments, the navigational planning artificial intelligence process may include, but is not limited to, a collision avoidance process, a local collision avoidance process (e.g. a local obstacle avoidance process, etc.), a global collision avoidance process (e.g. a global pathfinding process, etc.), a cost determination process, an enemy avoidance process, and/or any other navigational planning artificial intelligence process that meets the above definition. In one embodiment, the navigational planning artificial intelligence process may include a global navigation process followed by a local navigation process.

As an option, the artificial intelligence process may include a search algorithm for implementing the navigational planning. In one embodiment, the search algorithm may include an A* (A-star) search algorithm. In this case, the A* search algorithm refers to a graph search algorithm capable of finding a least-cost path from a start node to a goal node.

Although an A* search algorithm may be used for implementing the navigational planning in accordance with one embodiment, any suitable pathfinding algorithm may be utilized. For example, in one embodiment, the artificial intelligence process may include a path searching algorithm for identifying a path. In this case, the path may be identified among a plurality of obstacles and agents. In the context of the present description, obstacles refer to any object, static or dynamic, in a scene associated with a game.

As shown further in FIG. 1, the graphics processor 102 may be in communication with one or more software modules 104-108 capable of implementing/controlling functionality associated with different processes. For example, an artificial intelligence software module 104 may be utilized to implement/control the game artificial intelligence process and associated functionality. In this case, the artificial intelligence software module 104 may be utilized to implement the search algorithm and/or any other artificial intelligence process.

Additionally, a physics software module 106 may be utilized to implement/control any physics processes (e.g. simulation, etc.) and associated functionality. Furthermore, a rendering software module 108 may be utilized to implement/control any rendering processes (e.g. shading, etc.) and associated functionality. Moreover, the graphics processor 102 may be capable of accelerating the rendering process and the physics process, in addition to the artificial intelligence process.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
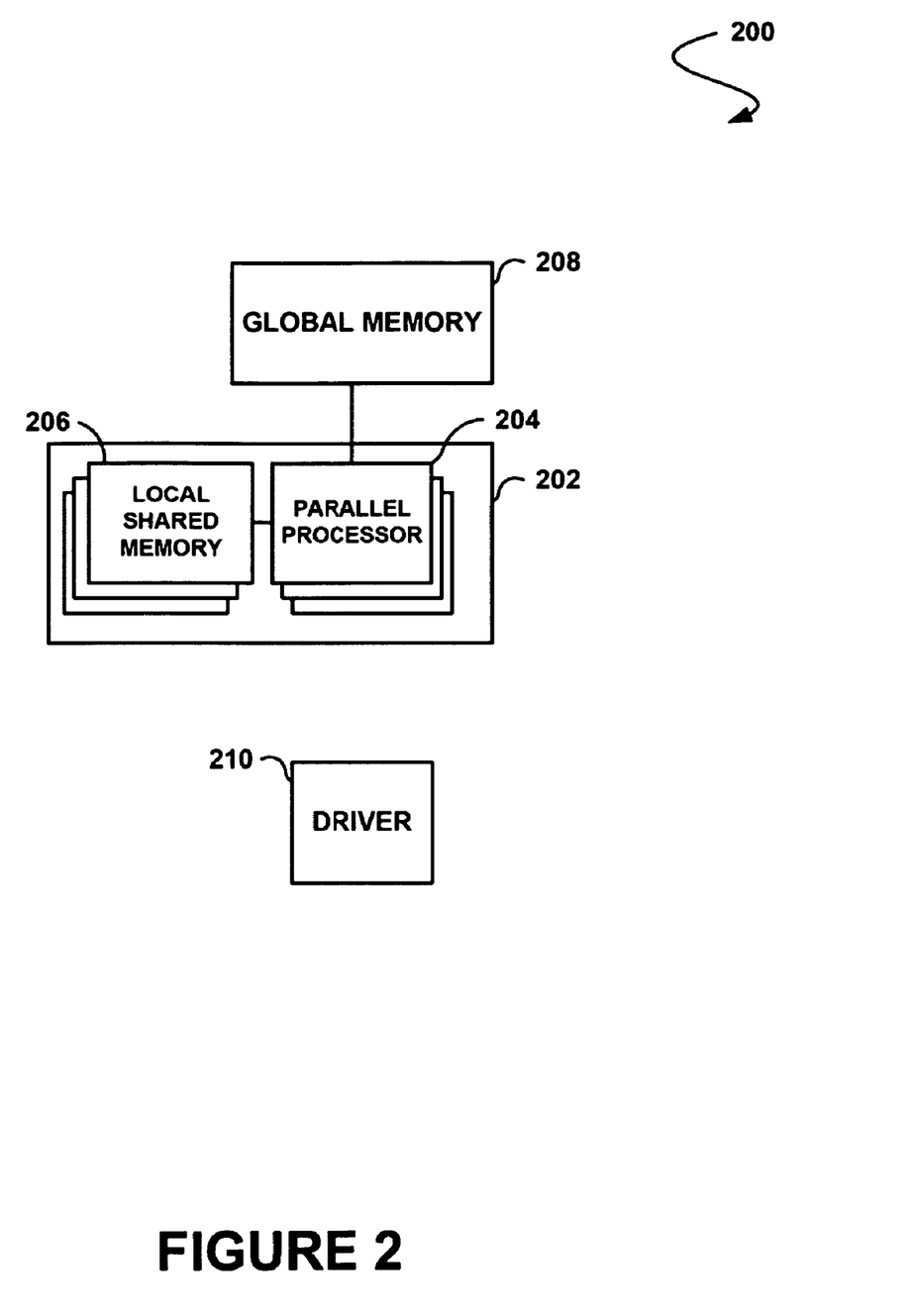
FIG. 2 shows a system for accelerating a game artificial intelligence process, in accordance with another embodiment.

FIG. 2 shows a system 200 for accelerating a game artificial intelligence process, in accordance with another embodiment. As an option, the present system 200 may be implemented in the context of the functionality and architecture of FIG. 1. Of course, however, the present system 200 may be implemented in any desired environment. It should also be noted that the aforementioned definitions may apply during the present description.

As shown, a parallel processing architecture 202 is provided. Such parallel processing architecture 202 includes a plurality of parallel processors 204. While not shown, such parallel processors 204 may be capable of operating on a predetermined number of threads. To this end, each of the parallel processors 204 may operate in parallel, while the corresponding threads may also operate in parallel.

In one embodiment, the parallel processing architecture 202 may include a single instruction multiple data (SIMD) architecture. In such a system, the threads being executed by the processor are collected into groups such that, at any instant in time, all threads within a single group are executing precisely the same instruction but on potentially different data.

In another embodiment, the foregoing parallel processing architecture 202 may include a graphics processor or any other integrated circuit equipped with graphics processing capabilities [e.g. in the form of a chipset, system-on-chip (SOC), core integrated with a CPU, discrete processor, etc.]. In still another embodiment, the foregoing parallel processing architecture 202 may include a processor with one or more vector processing elements such as the Cell processor, referring to the Cell Broadband Engine microprocessor architecture jointly developed by Sony®, Toshiba®, and IBM®.

With continuing reference to FIG. 2, the parallel processing architecture 202 includes local shared memory 206. Each of the parallel processors 204 of the parallel processing architecture 202 may read and/or write to its own local shared memory 206. This shared memory 206 may consist of physically separate memories associated with each processor or it may consist of separately allocated regions of one or more memories shared amongst the processors 204. Further, in the illustrated embodiment, the shared memory 206 may be embodied on an integrated circuit on which the processors 204 of the parallel processing architecture 202 are embodied.

Still yet, global memory 208 is shown to be included. In use, such global memory 208 is accessible to all the processors 204 of the parallel processing architecture 202. As shown, such global memory 208 may be embodied on an integrated circuit that is separate from the integrated circuit on which the processors 204 of the aforementioned parallel processing architecture 202 are embodied. While the parallel processing architecture 202 is shown to be embodied on the various integrated circuits of FIG. 2 in a specific manner, it should be noted that the system components may or may not be embodied on the same integrated circuit, as desired.

Still yet, the present system 200 of FIG. 2 may further include a driver 210 for controlling the parallel processing architecture 202, as desired. In one embodiment, the driver 210 may include a library, for facilitating such control. For example, such library 210 may include a library call that may instantiate the functionality set forth herein. Further, in another embodiment, the driver 210 may be capable of providing general computational capabilities utilizing the parallel processing architecture 202 (e.g. a graphics processor, etc.). An example of such a driver may be provided in conjunction with the CUDA™ framework provided by NVIDIA Corporation. In use, the driver 210 may be used to control the parallel processing architecture 202 to accelerate a game artificial intelligence process.

Figure 3:
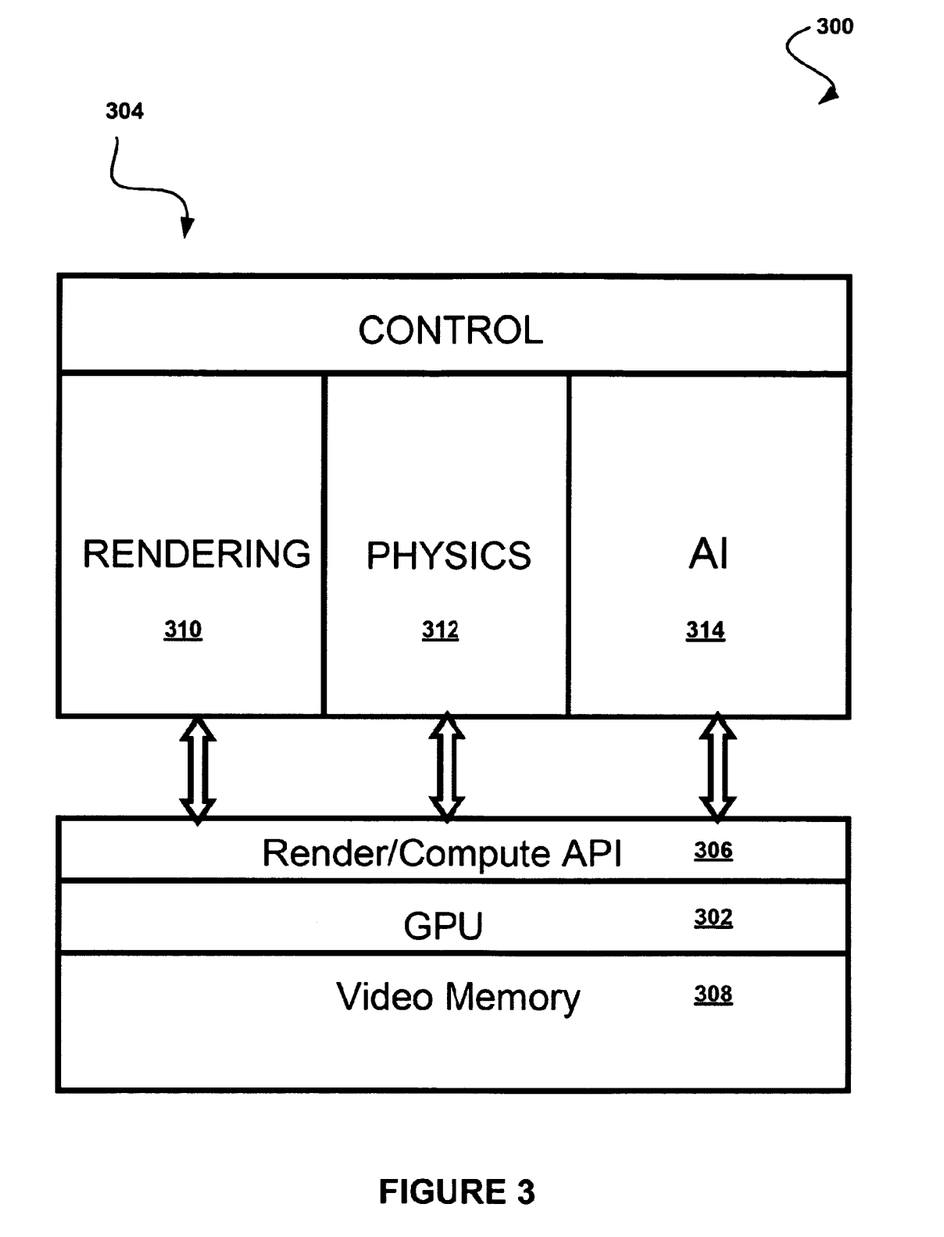
FIG. 3 shows a system for accelerating a game artificial intelligence process, in accordance with another embodiment.

FIG. 3 shows a system 300 for accelerating a game artificial intelligence process, in accordance with another embodiment. As an option, the present method 300 may be implemented in the context of the functionality and architecture of FIGS. 1-2. Of course, however, the system 300 may be implemented in any desired environment. Again, the aforementioned definitions may apply during the present description.

As shown, the system 300 includes a GPU 302 that is in communication with a plurality of game engine software components 304 through a render/compute application programming interface (API) 306. Additionally, the GPU 302 is in communication with video memory 308.

As shown further, the game engine software components 304 may include a rendering module 310 (e.g. for shading, etc.), a physics module 312 (e.g. for simulation, etc.), and an artificial intelligence (AI) module 314, all capable of communicating with the other modules and the GPU 302. In operation, the GPU 302 may be utilized to perform 3D graphics rendering, in the context of gaming, fed by the other engine software components 304.

Figure 4A:
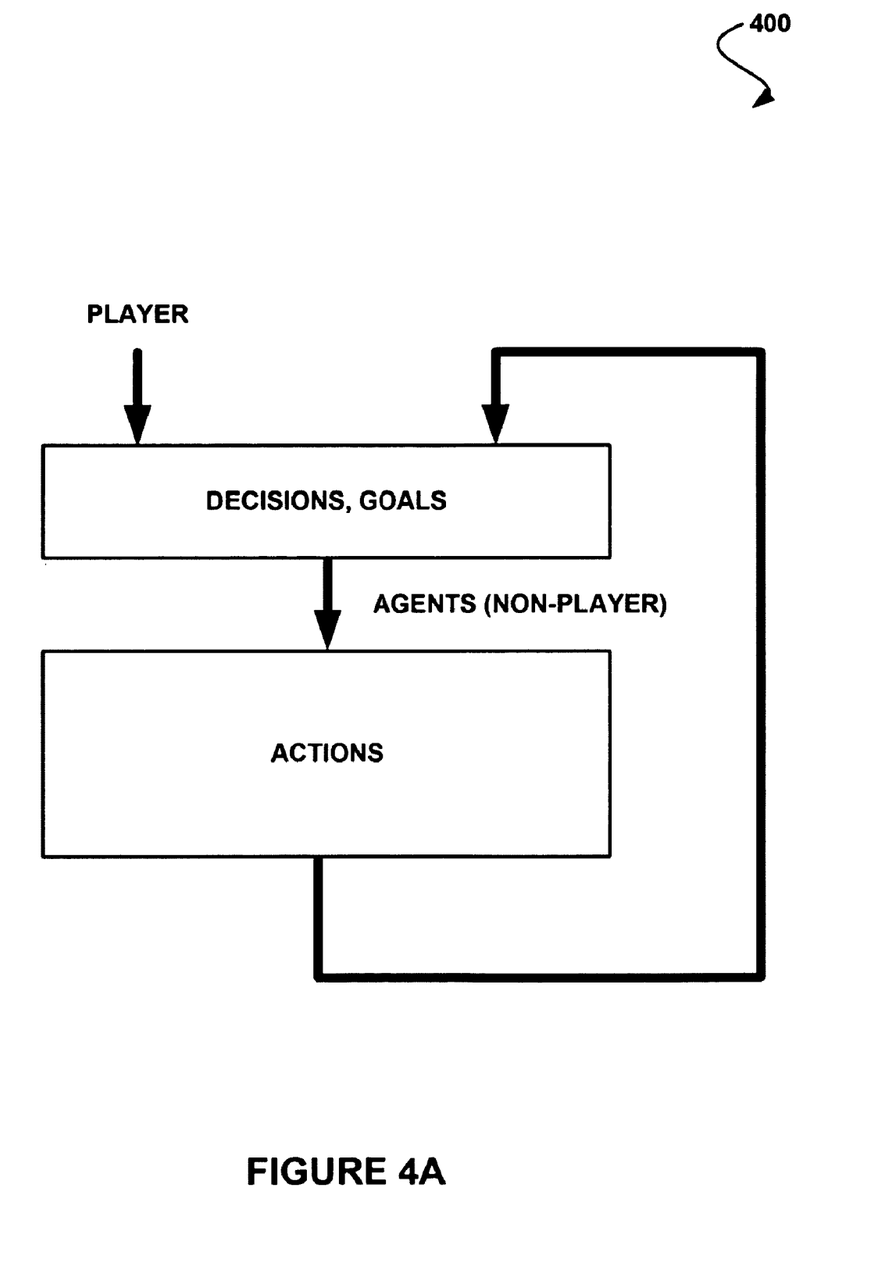
FIG. 4A shows a flow diagram illustrating how an abstraction layer may communicate iteratively with a core component where actions of agents occur, in accordance with one embodiment.

In one embodiment, the AI module 314 may be implemented as a high level abstraction layer that is game specific and may provide the framework for defining game goals and decision making. This abstraction layer may communicate iteratively with a core component where actions of agents take place. FIG. 4A shows a flow diagram 400 illustrating how an abstraction layer may communicate iteratively with a core component where actions of an agent occur, in accordance with one embodiment. As shown, the AI module may evaluate the decisions and goals of an agent, based on player input and feedback of actions performed by the agents.

With further reference to FIG. 3, functionality of the AI module 314 may include, but is not limited to, pathfinding, sensory simulation, and terrain analysis. In this case, pathfinding refers to the process of finding an optimal, preferably short path from a starting point to a goal point. In various embodiments, the pathfinding may include avoiding obstacles, detouring enemies, and minimizing costs (e.g. fuel, time, distance, equipment, etc.).

When implementing pathfinding utilizing a cost based search over a transitional roadmap graph data structure, a graph (G) may be formally defined as a pair of a set of nodes or vertices (N) binary linked with a set of edges (E) (e.g. G={N, E}). In this case, the ratio of edges to nodes may express a graph that is dense (e.g. where |E| is close to $|N|^2$) or sparse (e.g. where |E| is much less than $|N|^2$). Additionally, the graphs may be either directed or undirected. In a directed graph, nodes defining an edge are an ordered pair specifying an edge direction.

It should be noted that, pathfinding is one of the more pivotal intelligence actions in a game. Pathfinding may be implemented to optimally navigate each game agent to a goal position, avoiding collisions with other agents and obstacles in a constantly changing environment. In one embodiment, the task of pathfinding may include a cost based search over a transitional roadmap graph data structure. Nodes in the roadmap may be used to represent the position of a key area or an object in a scene and edges may attribute a cost to connected locations. An agent movement is not necessarily restricted to roadmap edges, however, and the navigation graph may be consulted to negotiate the environment for forward planning.

Edges in an undirected graph include unordered pair of nodes. In one embodiment, undirected graphs may be represented as directed acyclic graphs (DAG) by connecting each linked node pair with two bidirectional edges. An adjacency matrix and a collection of adjacency lists may be utilized as data structures for representing a graph, as illustrated in Tables 1 and 2, respectively.

TABLE 1

|   | 0 | 1 | 2 | 3 |
|---|---|---|---|---|
| 0 | 0 | 1 | 1 | 0 |
| 1 | 0 | 0 | 0 | 1 |
| 2 | 0 | 0 | 0 | 0 |
| 3 | 0 | 0 | 0 | 0 |

TABLE 2

| 0 | 1 | 2 |
|---|---|---|
| 1 | 3 |   |

Table 1 shows a graph data structure representation of an adjacency matrix utilizing an $O(N^2)$ footprint, independent of the number of edges in the graph. Table 2 shows a graph data structure representation of an adjacency list, where the list consumes O(N+E) memory space for both directed and undirected graphs.

In this case, the adjacency matrix representation refers to a two-dimensional array of Booleans capable of storing graph topology for a non-weighted graph. The matrix has the added property of quickly identifying the presence of an edge in the graph. In some cases (e.g. for large sparse graphs), the adjacency matrix may be inefficient.

In these cases, adjacency lists may be utilized to provide a compact storage for the more wide spread sparse graphs. Each node may store a list of immediately connected edges. As an option, adjacency list data structures may be adapted to represent weighted graphs for traversing an edge that is associated with a cost property for moving from one node to another.

Various algorithms may be utilized to search and explore the topology of a graph. In one embodiment, every node of a graph may be visited, any path between two nodes may be found, and/or the best path between two nodes may be found. Often, game navigation planning is concerned with arriving at an optimal path that may include a shortest path between two nodes, a path that takes an agent between two points in the fastest time, or a path to avoid an enemy line of sight.

In various embodiments, the searches for these paths may be classified as either uninformed or informed. Informed searches reduce overall amount of computations by making intelligent choices in selecting the graph region of interest. The problem set of pathfinding attends to informed searches that consider a cost weighted edge for traversing a graph. In some cases, the cost alone may be sufficient to determine the action sequence that leads to any visited node. Table 3 shows pseudo-code for a forward search algorithm expressed by using a state space representation, in accordance with one embodiment.

TABLE 3

```
01: Q.Insert(n_S) and mark n_S as visited
02: while Q not empty do
03:    n ← Q.Extract( )
04:    if(n == n_G) return SUCCESS
05:    for all u ∈ U(n) do
06:       n' ← f(n, u)
07:       if n' not visited then
08:          Mark n' visited
09:          Q.Insert(n')
10:       else
11:          Resolve duplicate n'
12: return FAILURE
```

As illustrated in Table 3, live nodes are stored in a priority queue Q. In this case, $n_S$ and $n_G$ are the start and goal positions, respectively. Additionally, u is an action in a list of actions U for the current node n and n' is a next adjacent node derived from the state transition function f(n, u).

A planning state may represent position, velocity, and/or orientation of an agent. The definition of a state may be utilized to formulate a planning problem and to design an algorithm to solve the planning problem. In one embodiment, the planning problem may include starting in some initial state and trying to arrive at a specified goal state. Feasibility and optimality are often concerns of a plan that applies a search action.

In one embodiment, there may be one of three possible node states at any point during a search. For example, the states may include an unvisited state, a dead state, and an alive state. In this case, visited nodes, along with all possible next nodes already visited, may be considered dead. Furthermore, alive nodes refer to visited nodes with possible non-visited adjacent nodes.

As noted above, various algorithms may be utilized to search and explore the topology of a graph, including a best-first search (BFS) algorithm, a Dijkstra search algorithm, and an A* algorithm. Each algorithm may be implemented utilizing the pseudo-code shown in Table 3, where a different sorting function is defined to the priority queue Q depending on the algorithm. Given a path defined by its endpoint positions, a cost during a search may be evaluated from the current node to either the starting point, to the goal, or to both. As an option, a heuristic estimate of the cost to get to the goal from a given node may be incorporated to reduce the overall graph space explored.

An A* search algorithm is both admissible and considers fewer nodes than any other admissible search algorithm with the same heuristic function. In this case, admissible refers to the concept that the true cost will be at least as great as the estimate. Table 4, illustrates pseudo code of the A* algorithm, in accordance with one embodiment. In this case, g(n) is the cost from start to node n, h(n) is the heuristic cost from node n to goal, f is the entity to sort in the priority queue, and its cost member is the sum of g(n) and h(n).

TABLE 4

```
01: f = priority queue element {node index, cost}
02: F = priority queue containing initial f (0,0)
02: G = g cost set initialized to zero
03: P, S = pending and shortest nullified edge sets
04: n = closest node index
05: E = node adjacency list
06: while F not empty do
07:    n ← F.Extract( )
08:    S[n] ← P[n]
09:    if n is goal then return SUCCESS
10:    foreach edge e in E[n] do
11:       h ← heuristic(e.to, goal)
12:       g ← G[n] + e.cost
13:       f ← {e.to, g + h}
14:       if not in P or g < G[e.to] and not in S then
15:          F.Insert(f)
16:          G[e.to] ← g
17:          P[e.to] ← e
18: returnFAILURE
```

In operation, the outer loop of the A*algorithm commences as long as the priority queue contains live nodes. Queue elements are node index based and may be sorted by their cost values in an ascending order. The cost value of the queue element is the sum of current-to-start and current-to-goal costs.

The top element of the queue may be extracted, moved to the resolved shortest node (or edge) set and, if the current node position matches the goal, the search may terminate successfully. If the current node position does not match the goal, adjacent nodes (or edges) may be further evaluated to their cost. In this case, unvisited nodes or live nodes with lesser cost to start may be pushed onto both a pending list of live nodes (or edges) and onto the priority queue. A successful search may return both a total cost value of the resolved path and a list of ordered nodes that provides plotted waypoints.

Using the A* search algorithm, the general data parallelism may be exploited in performing global navigation planning for many thousands of game agents. In other words, the A* path searching algorithm may be capable of processing much greater than one-thousand agents. In one embodiment, the A* search algorithm may be implemented on a device with a relatively large SIMD thread group, such as the CUDA™ framework provided by NVIDIA Corporation.

CUDA stands for Compute Unified Device Architecture and includes hardware and software architecture for managing a GPU as a data parallel computing device. When programmed through CUDA, the GPU is viewed as a device capable of executing a very high number of threads in parallel. A single program, called a kernel, (e.g. written in a C extended programming language) is compiled to the device instruction set and operates on many data elements concurrently.

To this extent, the GPU may be regarded as a coprocessor to the main CPU and data parallel, where compute intensive portions of applications running on the host may be offloaded onto the device. The CUDA software stack is largely partitioned into a low level hardware driver and a light weight runtime layer. As an option, an AI software module may communicate with the runtime application programming interface for implementing functionality set forth herein.

CUDA provides general DRAM memory addressing and supports both scatter and gather memory operations. From a programming perspective, this translates into the ability to read and write data at any location in DRAM, much like on a CPU. Both the host and the device maintain their own DRAM, referred to as host memory and device memory, respectively. Data may be copied from one DRAM to the other through optimized API calls that utilize high performance Direct Memory Access (DMA) engines of the device.

The batch of threads that executes a kernel is organized as a grid of thread blocks. A thread block is a collection of threads that can cooperate by efficiently sharing data through fast shared memory. In a block each thread is identified by its thread ID.

A block can be specified as any of one, two, or three dimensional arbitrary sized array, simplifying software thread indexing. The number of threads per block is finite and may be configured for a grid extent of thread blocks, all performing the same kernel. The grid insures efficient distribution of threads on the GPU. A thread block in a grid has a unique ID and a grid of blocks may be defined as a one, two, or three dimensional array.

The CUDA device may be implemented as a set of multi-processors, each of a SIMD architecture, where at any given clock cycle, a processor of the multiprocessor executes the same instruction, but may operate on different data. The CUDA memory model defines a hierarchy ranking from per thread read-write registers and local memory, to per block read-write shared memory, and per grid read-write global memory, and read only constant and texture memory. The global, constant, and texture memory spaces can be read from or written to by the host and are persistent across kernel launches by the same application.

The CUDA device thread scheduler decomposes a thread block onto smaller SIMD thread groups called warps. Occupancy, the ratio of active warps per multiprocessor to the maximum number of warps allowed, is an execution efficiency criterion largely determined by the register and shared memory resources claimed by the kernel. An execution configuration with integral multiple of warps assigned to a thread block is a first line of order to insure adequate SIMD efficiency. An Occupancy Calculator tool may further assist the programmer in finely matching threads per block to kernel usage of shared resources.

As noted above, in one embodiment, CUDA and other parallel processing architectures may be utilized for accelerating a game artificial intelligence process through the implementation of an A* search algorithm. For example, the sparse roadmap graph may be encapsulated in an adjacency lists data structure. Being read-only, the graph may be stored as a set of linear device memory regions bound to texture references. As an option, device memory reads through texture fetching may be cached to achieve a higher bandwidth for localized access.

The A* inner loop exemplifies coherence in accessing adjacency list of edges sequentially. In addition, texture reference bound to linear device memory has a much larger address extent when compared to a CUDA array. For example, texture reference bound to linear device memory may include a maximum width of $2^{27}$ (128M) components, which may be utilized to accommodate large footprint graphs. In one embodiment, texture access in the pathfinding kernel may use a family of fetch functions associated with the parallel processing architecture being utilized (e.g. CUDA, etc.).

As an option, the roadmap graph storage set may be refitted to enhance GPU coherent access. In this case, the set of textures may include a node list, a single edge list that serializes all the adjacency lists into one collection of edges, and an adjacency directory that provides index and count for an adjacency list of a specific node. The adjacency directory entry pair may map directly onto the inner loop control parameters of the A* algorithm. As a result, one adjacency texture access may be amortized across several fetches from the edge list texture. Nodes and edges may be stored as four IEEE float components and the adjacency texture may include a two integer component texture. A texture component layout is depicted in Table 5, in accordance with one embodiment.

TABLE 5

| node | | | |
|---|---|---|---|
| id | position.x | position.y | position.z |

| edge | | | |
|---|---|---|---|
| from | to | cost | reserved |

| adjacency | |
|---|---|
| offset | offset + count |

As an option, and in the above example, the roadmap graph texture set may include either two or four components to comply with a fetch function associated with the CUDA framework [e.g. tex1Dfetch( )]. As shown in Table 5, the component layout is configured to include the node with a unique identifier and a three component IEEE float position. The edge has a direction node identifier pair {from, to}, a float cost, and a reserved field. Furthermore, the adjacency directory element is composed of an offset into the edge list and a count of edges in the current adjacency list. In one embodiment, the roadmap graph texture set may include a single copy memory resource shared across a grid of threads.

It is often the case in games for the roadmap to be constantly modified. An incremental change per time step carries little overhead in adding and removing nodes and edges of the currently loaded roadmap in host memory. A more substantial environment transformation could potentially require a new roadmap generation that is subject to a higher cost for loading the graph.

The working set for a CUDA architecture is commonly referred to as per thread private local and shared memory resources. In the parallel pathfinding workload, an agent may constitute a thread on the GPU. In one embodiment, the A* kernel may include five inputs and two outputs that collectively form the working set.

As an option, the inputs may each be in the form of an array and include a list of paths, each defined by a start and a goal node ID, with one path per agent. As another option, the inputs may include a list of costs from the start position (e.g. G, illustrated in Table 4), initialized to zero. Additionally, the inputs may include a list of costs combined from start and to goal (e.g. F, illustrated in Table 4), initialized to zero. Furthermore, the inputs may include a pair of lists of pointers for each of the pending and the shortest edge collections (e.g. P and S, respectively, illustrated in Table 4) initialized to zero.

The memory space storage complexity for both the costs and edge input lists may be represented by O(T*N), where T is the number of agents participating in the game and N is the number of roadmap graph nodes. The pair of outputs produced by the kernel may include a list of accumulated costs for the kernel resolved optimal path, one scalar cost value for each agent, and a list of subtrees, each a collection of three dimensional node positions, that formulate the resolved plotted waypoints of an agent.

Kernel resources associated with both the inputs and outputs may be allocated in linear global memory regions. In one embodiment, the involved data structures may be memory aligned with a size of 4, 8, or 16 bytes to limit multiple load and store instructions per memory transfer. As an option, the arranging global memory addresses, simultaneously issued by each thread of a warp, into a single contiguous, memory aligned transaction may be implemented to yield optimal memory bandwidth. In one embodiment, coalesced 4 byte, 8 byte, or 16 byte accesses may be utilized. Furthermore, a strided and interleaved, per thread, working set access versions of kernels may be implemented.

Figure 4B:
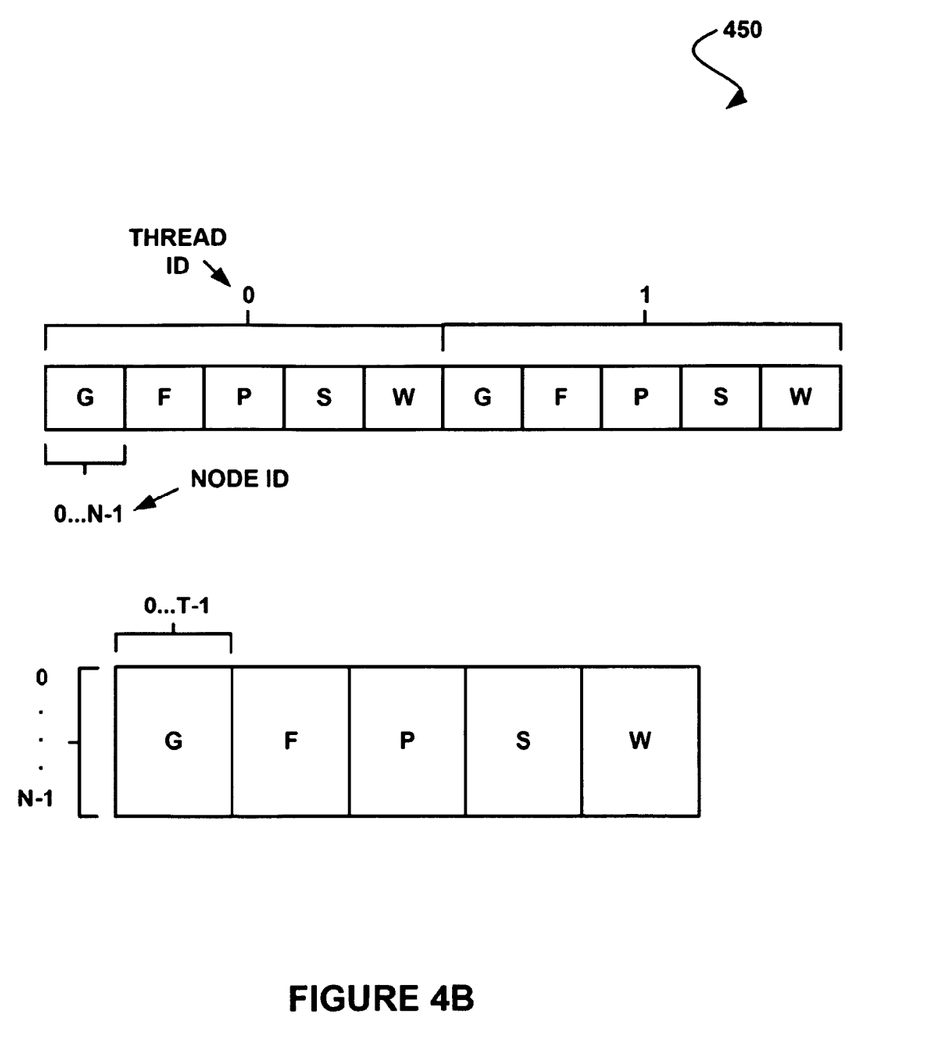
FIG. 4B shows a technique for coalescing global memory transactions in a graphics processing unit (GPU), in accordance with one embodiment.

It should be noted that the effort of coalescing global memory transactions is unique to the GPU. FIG. 4B shows a technique 450 for coalescing global memory transactions in a GPU, in accordance with one embodiment, where G refers to the cost from start, F refers to the sum of costs from start to goal, P and S refer to visited and dead nodes, respectively, and W refers to the subtree, plotted waypoints.

As an option, a strided memory layout may be implemented utilizing a node ID fast axis. In another embodiment, an interleaved organization may be implemented utilizing a thread ID running index. Furthermore, a contiguous memory access may be implemented. In this case, the contiguous memory access may be implemented across a thread warp. In this way, array indexing may be implemented in an inexpensive manner.

As an option, the priority queue in the search algorithm may maintain a set of element pairs composed of a float type cost and an integer node ID. Elements with the smallest cost may be placed on top of the queue, regardless of the insertion order. The queue may be realized as an array of structure pointers in the parallel processing architecture.

In some cases, the cost associated with the insertion of an element and the extraction/deletion of the element may be a concern. The priority queue is most accessed inside the search inner loop and its operation efficiency affects an overall performance. As an option, the priority queue may be configured to operate in a fixed size array, set to the number of graph nodes N, and configured to avoid dynamic allocation. In various embodiments, either a naïve or a heap based operation may be implemented for inserting and/or extracting an element.

Table 6A shows a CUDA device implementation for a heap based priority queue insertion and Table 6B shows a CUDA device implementation for a heap based priority queue extraction, in accordance with one embodiment. In this case, both the insertion and the extraction are of running time complexity O(log C), where C is the number of elements queued. Furthermore, the function "heapify" runs one round of a heapsort loop after removing the top of the heap and swapping the last element into its place.

TABLE 6A

```
01:  _device_ void
02:  insert(CUPriorityQ* pq, CUCost c)
03:  {
04:    int i = ++(pq→size);
05:    CUCost* costs = pq→costs;
06:    while(i > 1 && costs[i>>1].cost > c.cost) {
```

TABLE 6A-continued

```
07:      costs[i] = costs[i>>1];
08:      i >>= 1;
09:    }
10:    pq→costs[i] = c;
11: }
```

TABLE 6B

```
01: _device_ CUCost
02: extract(CUPriorityQ* pq)
03: {
04:    CUCost cost;
05:    if(pq→size >= 1) {
06:        cost = pq→costs[1];
07:        pq→costs[1] = pq→costs[pq→size-];
08:        heapify(pq);
09:    }
10:    return cost;
11: }
```

In operation, an agent may define a start and goal end points and constitute a disjoint thread entity for performing an optimal search, operating over the shared roadmap graph. In this case, the total number of participating agents in a game may define a launch scope of the parallel processing architecture being utilized to perform the gaming.

The navigation software (e.g. the AI module 314 of FIG. 3) may lay out threads in a one dimensional grid of one dimensional thread blocks. As an option, the software may initially consult the device properties provided the parallel processing architecture (e.g. CUDA, etc.) and set not to exceed caps for the dimensions of each the grid and the block. In this case, the A* kernel may have no explicit allocation of device shared memory and any shared memory usage may be an implicit assignment by a compiler of the parallel processing architecture.

The number of threads allocated per block is therefore largely dependent on the register usage by the kernel. In the case of CUDA, the occupancy metrics for thread efficiency scales well for regular algorithms with high arithmetic intensity.

In some cases, the total roadmap graph texture and the working set memory space allocated for all game agents may exceed the global memory available on a given GPU. The available global memory is an attribute of the device properties provided by the parallel processing architecture. In one embodiment, the pathfinding software (e.g. the AI module 314) may validate the total memory required for the grid of threads and automatically split the computation into multi-launch tasks. Each launch in the sequence may be synchronized and partial search results may be copied from the device to the host in a predefined offset into output lists. A per launch allocation may be utilized to ensure that operation is in bounds, providing a graceful path for running parallel pathfinding on lower end GPU platforms.

In some cases, the last thread block in a grid may be only partially occupied with active threads. In these cases, the A* kernel may compare the current thread ID against the total number of threads (i.e. the total number of agents) provided to the kernel as an input argument, and exit before committing to any search computation.

Using these techniques, a multitude of required paths may be passed to AI software by a user for execution in parallel, where each path constitutes a GPU thread and each path is distributed in a form of a grid composed of thread blocks. Block occupancy of threads may be predefined for both optimal efficiency and the saving of hardware resource usage (e.g. register usage, etc.). Additionally, resources for parallel path finding may be divided into global and shared across all threads and per thread local.

Further, the graph data structure may include a global resource that is split into three, one dimensional textures, one for each of the nodes, edges, and adjacencies. The adjacency texture may include a two component texture with elements that store a pair of offsets into the edge texture and a count implying the number of connected edges for the current node. As an option, the edge offset may be derived using a prefix sum. Furthermore, per thread local data may include the various cost arrays of the pending and shortest lists. At the conclusion of the search, a cost value of the resolved path may be returned by the parallel processing architecture for each active thread. Additionally, a list of subtrees may be returned by the parallel processing architecture, each subtree being a collection of three dimensional node positions that formulate the resolved plotted waypoints of an agent.

In various embodiments, A* implementations on the parallel processing architecture hardware may take advantage of spawning threads within a kernel. The A* inner loop may be further parallelized assuming no dependencies and that the validation of the priority queue is deferred only once the inner loop completes. Additionally, GPU devices that support efficient double precision math computation may be utilized for floating point accumulation of search cost values. As another option, the caching of global memory reads may be implemented to enhance efficiency (e.g. for priority queue insertion and extraction, etc.).

Figure 5:
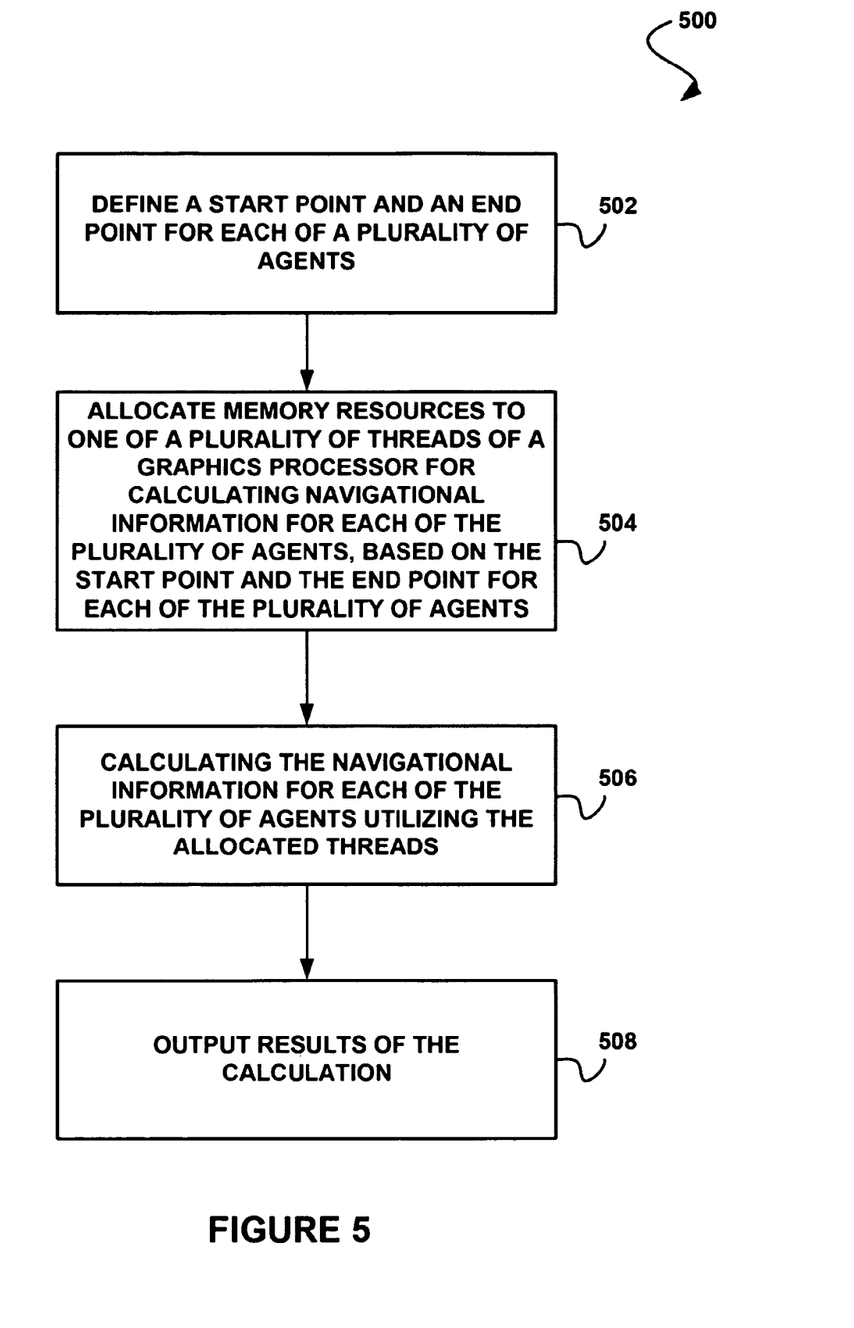
FIG. 5 shows a method for accelerating a game artificial intelligence process, in accordance with one embodiment.

FIG. 5 shows a method 500 for accelerating a game artificial intelligence process, in accordance with one embodiment. As an option, the present method 500 may be implemented in the context of the functionality and architecture of FIGS. 1-4. Of course, however, the method 500 may be carried out in any desired environment. Once again, the aforementioned definitions may apply during the present description.

As shown, a start point and an end point for each of a plurality of agents of a game are defined. See operation 502. In this case, the end point refers to a goal point of the agent.

Memory resources are then allocated to one of a plurality of threads of a graphics processor for calculating navigational information for each of the plurality of agents, based on the start point and the end point for each of the plurality of agents. See operation 504. The navigational information (e.g. path information, etc.) for each of the plurality of agents is then calculated utilizing the threads. See operation 506.

Results of the calculation are then output. See operation 508. In this case, the output may be utilized to direct the agent movement in the scene. Furthermore, the calculated output may be updated based on the actions of a player, the agent, and/or any obstacles in the scene and/or path of the agent.

Figure 6:
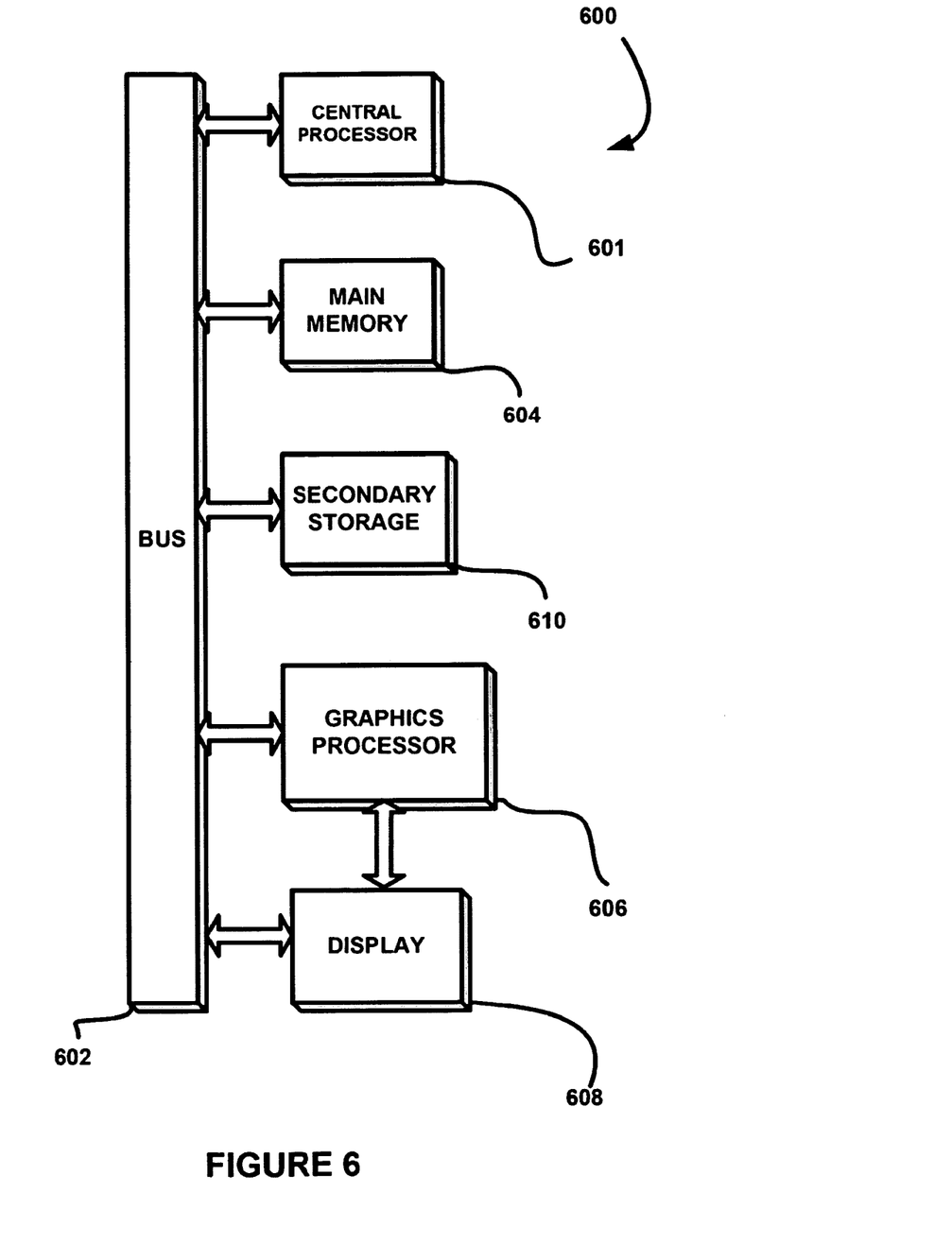
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one host processor 601 which is connected to a communication bus 602. The system 600 also includes a main memory 604. Control logic (software) and data are stored in the main memory 604 which may take the form of random access memory (RAM).

The system 600 also includes a graphics processor 606 and a display 608, i.e. a computer monitor. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the system 600 to perform various functions. Memory 604, storage 610 and/or any other storage are possible examples of computer-readable media.

In one embodiment, the architecture and/or functionality of the various previous figures may be implemented in the context of the host processor 601, graphics processor 606, an integrated circuit (not shown) that is capable of at least a portion of the capabilities of both the host processor 601 and the graphics processor 606, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, lap-top computer, and/or any other type of logic. Still yet, the system 600 may take the form of various other devices including, but not limited to, a personal digital assistant (PDA) device, a mobile phone device, a television, etc.

Further, while not shown, the system 600 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
a graphics processor capable of accelerating a game artificial intelligence process, the graphics processor further:
defining a start point and an end point for each of a plurality of agents;
allocating memory resources to one of a plurality of threads of the graphics processor for calculating navigational information for each of the plurality of agents, based on the start point and the end point for each of the plurality of agents;
calculating the navigational information for each of the plurality of agents utilizing the threads; and
outputting results of the calculation.

2. The apparatus of claim 1, wherein the graphics processor includes a graphics processing unit.

3. The apparatus of claim 1, wherein the graphics processor includes a parallel processor architecture.

4. The apparatus of claim 1, wherein the graphics processor includes a multi-core processor architecture.

5. The apparatus of claim 1, wherein the artificial intelligence process includes a navigational planning artificial intelligence process.

6. The apparatus of claim 5, wherein the navigational planning artificial intelligence process includes a collision avoidance process.

7. The apparatus of claim 6, wherein the collision avoidance process includes a global collision avoidance process.

8. The apparatus of claim 6, wherein the collision avoidance process includes a local collision avoidance process.

9. The apparatus of claim 1, wherein the artificial intelligence process includes a search algorithm.

10. The apparatus of claim 9, wherein the search algorithm includes an A-star search algorithm.

11. The apparatus of claim 1, wherein the artificial intelligence process includes a path searching algorithm for identifying a path.

12. The apparatus of claim 11, wherein the path is identified among a plurality of obstacles and the plurality of agents.

13. The apparatus of claim 12, wherein the path searching algorithm is capable of processing greater than one-thousand agents.

14. The apparatus of claim 1, wherein the graphics processor is further capable of accelerating a rendering process and a physics process.

15. An apparatus, comprising:
a graphics processor capable of accelerating a navigational planning artificial intelligence process, the graphics processor further:
defining a start point and an end point for each of a plurality of agents;
allocating memory resources to one of a plurality of threads of the graphics processor for calculating navigational information for each of the plurality of agents, based on the start point and the end point for each of the plurality of agents;
calculating the navigational information for each of the plurality of agents utilizing the threads; and
outputting results of the calculation.

16. The apparatus of claim 15, wherein the navigational planning artificial intelligence process includes a path searching algorithm for identifying a path.

17. The apparatus of claim 16, wherein the path is identified among a plurality of obstacles and the plurality of agents.

18. The apparatus of claim 17, wherein the path searching algorithm is capable of processing greater than one-thousand agents.

19. The apparatus of claim 15, wherein the graphics processor remains in communication with memory and a display via a bus.

20. A method, comprising:
defining a start point and an end point for each of a plurality of agents;
allocating memory resources to one of a plurality of threads of a graphics processor for calculating navigational information for each of the plurality of agents, based on the start point and the end point for each of the plurality of agents;

calculating the navigational information for each of the plurality of agents utilizing the threads; and outputting results of the calculation.

21. A computer program product embodied on a non-transitory computer readable medium, comprising:

computer code for defining a start point and an end point for each of a plurality of agents;

computer code for allocating memory resources to one of a plurality of threads of a graphics processor for calculating navigational information for each of the plurality of agents, based on the start point and the end point for each of the plurality of agents;

computer code for calculating the navigational information for each of the plurality of agents utilizing the threads; and computer code for outputting results of the calculation.

* * * * *